United States Patent [19]

Frieder, Jr.

[11] 3,733,005
[45] May 15, 1973

[54] DUNNAGE DOOR FOR CARGO BOX

[75] Inventor: Leonard P. Frieder, Jr., Waverly, Pa.

[73] Assignee: Gentex Corporation, New York, N.Y.

[22] Filed: June 1, 1971

[21] Appl. No.: 148,845

[52] U.S. Cl......220/85 B, 206/DIG. 30, 105/369 BA
[51] Int. Cl. .............................................B65b 3/00
[58] Field of Search ....................................220/85 B; 105/369 BA; 206/DIG. 30

[56] References Cited

UNITED STATES PATENTS

| 2,907,580 | 10/1959 | Tietig | 105/369 BA X |
| 3,243,822 | 4/1966 | Lipkin | 105/369 BA X |
| 2,764,950 | 10/1956 | Finnell | 105/369 BA |
| 2,834,606 | 5/1958 | Bertrand | 105/369 BA |
| 3,192,879 | 7/1965 | Pier | 105/369 BA |
| 3,514,151 | 5/1970 | Hacker | 105/369 BA |

FOREIGN PATENTS OR APPLICATIONS

| 1,173,782 | 10/1958 | France | 220/85 B |
| 1,917,909 | 11/1969 | Germany | 220/85 B |

Primary Examiner—M. Henson Wood, Jr.
Assistant Examiner—John J. Love
Attorney—Shenier and O'Connor

[57] ABSTRACT

A dunnage door for use with a cargo box adapted to be partially filled with cargo from the back or the bottom toward the front or the top on which the door is assembled in which the interior of the door is provided with normally collapsed expansible means adapted to be expanded to fill the space between the door and the cargo to prevent movement of the cargo within the box during shipment.

3 Claims, 3 Drawing Figures

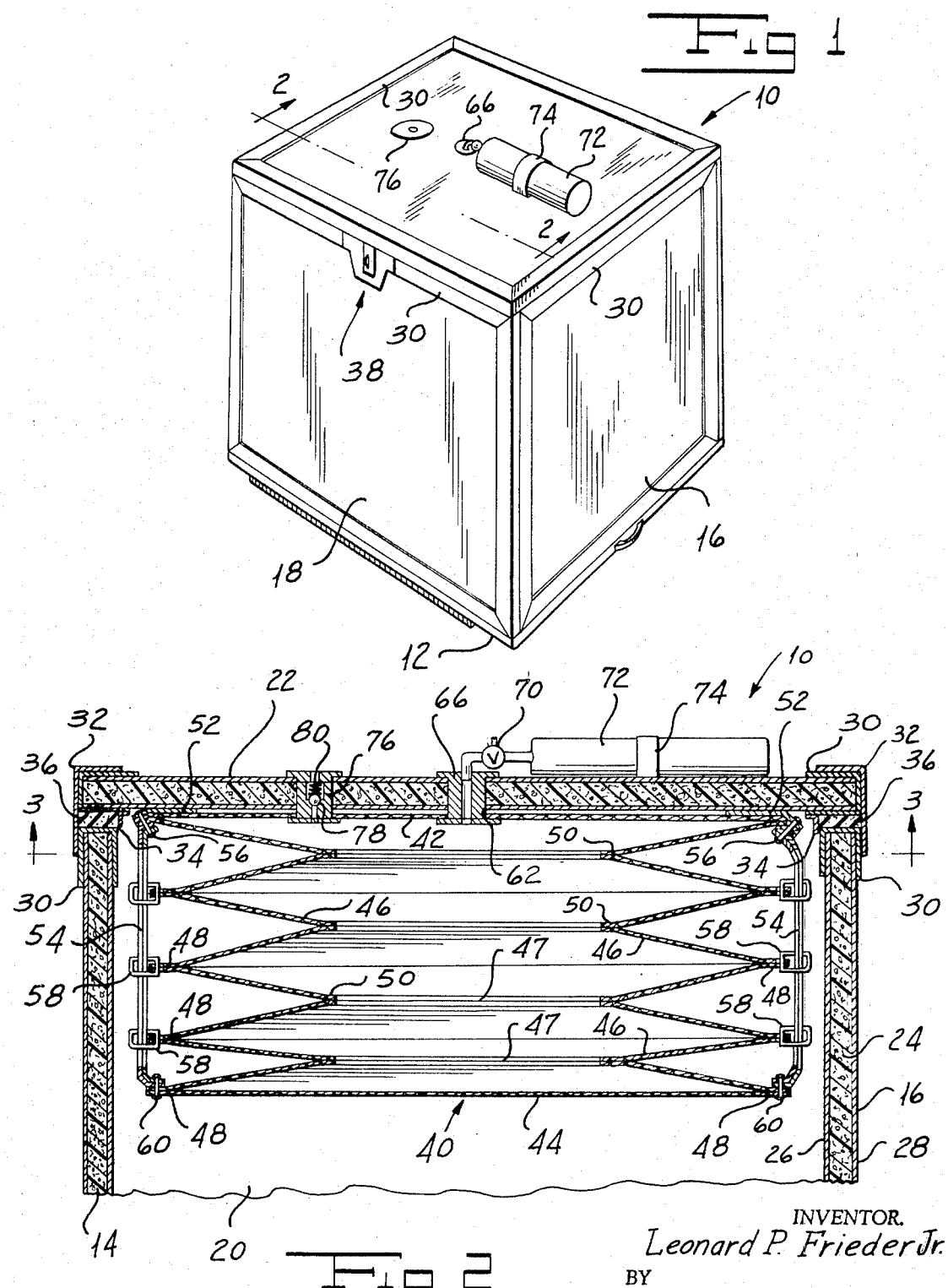

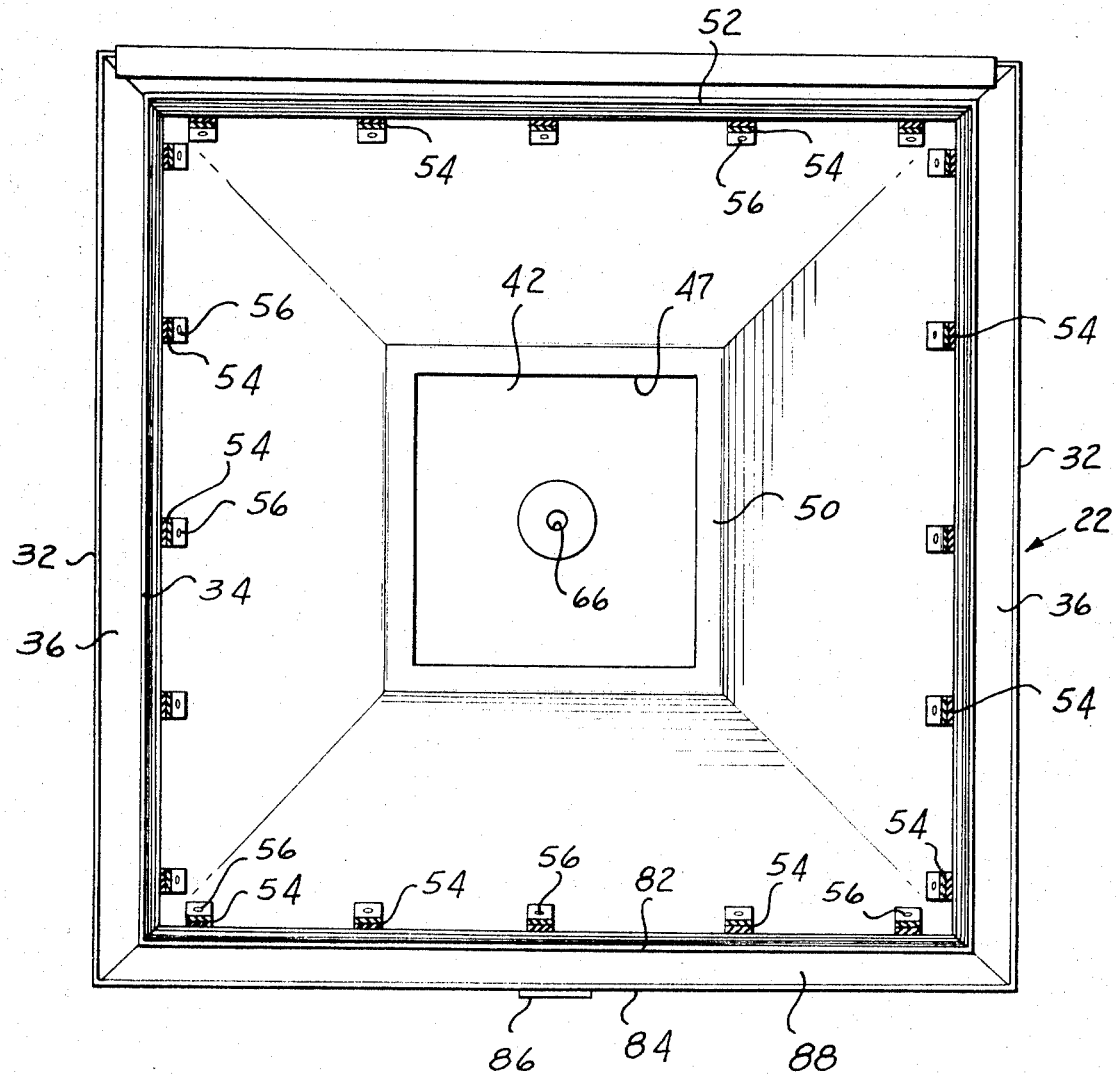

DUNNAGE DOOR FOR CARGO BOX

BACKGROUND OF THE INVENTION

There have recently been developed in the prior art cargo boxes which are readily erected and disassembled and which are especially adapted for use in connection with aircraft cargo. It has been discovered that the available space within an aircraft is more efficiently used and cargo-handling operations are more expeditiously carried out if articles to be shipped first are stowed in boxes of a standard size and then the boxes in turn are loaded onto the aircraft. Preferably these boxes should be reusable and have a long life. They are disassemblable so as to be able to be stored and shipped flat and are readily erected at the point at which they are to be used. It will be apparent that for most efficient manufacture and use of such boxes they are made in standard sizes.

In most instances the cargo to be shipped in aircraft is loaded in the boxes and at least the last box has some space left therein between the front or top of the box and the opening over which the last side or door of the box is to be assembled. Such is the case also wherein the articles to be stowed in a particular box do not completely fill the space therein. In order to prevent damage to articles in partially filled containers during shipment the container space must be completely filled. In the maritime field the material which is used to fill such spaces is known as "dunnage." While in the case of an aircraft cargo box the excess space could be filled with many different materials, such materials create a problem of disposal at the point of termination of the cargo and require that such materials be stored so as to be at hand at the point at which the box is loaded.

I have invented a dunnage door for a cargo box which overcomes the problems outlined hereinabove. My dunnage door can readily be actuated to fill the excess space in a cargo box. It will take up such space over a wide range of partial fillings of the container. It does away with the necessity for storing and handling loose dunnage material. It further eliminates the problem of disposing of such loose used dunnage material at the termination point. It is relatively simple for the result achieved thereby. It takes up very little extra space over that occupied by the door of the cargo box. It permits the cargo box to be stowed flat for storage and shipment when empty.

SUMMARY OF THE INVENTION

One object of my invention is to provide a dunnage door for a cargo box to take up excess space in the box over that occupied by the cargo.

Another object of my invention is to provide a dunnage door for a cargo box which does away with the necessity for storing loose dunnage material.

A further object of my invention is to provide a dunnage door for a cargo box which eliminates the problem of disposing of loose dunnage material.

Still another object of my invention is to provide a dunnage door for a cargo box which permits the disassembled box to be stored and shipped flat.

A further object of my invention is to provide a dunnage door for a cargo box which can take up a relatively wide range of space within the box.

Other and further objects of my invention would appear in the following description.

In general my invention contemplates the provision of a dunnage door for use with a disassemblable cargo box adapted to be erected and partially filled with cargo from the back or bottom toward the front or top and over which the door is assembled in which the inside of the door is provided with normally collapsed expansible or extendible means adapted to be actuated to fill the space between the door and the cargo to prevent movement of cargo within the box during shipment. In its collapsed condition the expansible means lies flat against the inside surface of the front or top to permit the box to be stored and shipped in flat condition.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a perspective view of one form of cargo box provided with my dunnage door.

FIG. 2 is a fragmentary sectional view of the box illustrated in FIG. 1 taken along the line 2—2 of FIG. 1.

FIG. 3 is a sectional view of the box illustrated in FIG. 2 taken along the line 3—3 of FIG. 2 with parts removed.

DESCRIPTION OF THE PREFERRED EMBODIMENT

Referring now to the drawings one form of cargo box indicated generally by the reference character 10 with which my dunnage door may be used can be of the general type disclosed and claimed in the co-pending application of August G. Luisada, Ser. No. 6,855, filed Jan. 29, 1970, now U.S. Pat. No. 3,655,087 for a Lightweight Knockdown Container. The box shown in that application as well as other various forms of knockdown boxes or containers with which my dunnage door may be used comprise a plurality of panels adapted to be stowed in a stack and to be shipped in that condition while being readily erectible at the location at which the cargo is to be loaded. The particular form of box 10 which I have shown in the drawings includes a base 12, sides 14 and 16, a front 18, a back 20 and a top 22. As is more fully described in the co-pending application, the base, sides, front and back first are erected with interlocking elements at adjacent edges and with seals around these edges. The top panel 22 then is assembled on the container in a manner to be described to close the box. Other forms of boxes or containers to which my dunnage door can be applied may be of the type in which all of the panels except the front panel 18 are erected before the box is filled and then the panel 18 is assembled over the open front. In either case my dunnage door comprises the last panel to be placed in position over the container.

In the particular structure which I have shown in the drawings the various panels of the box may be of any suitable construction so as to provide sufficient strength to withstand the loads to which they will be subjected while at the same time being relatively light. For example, each of the panels may comprise a central body portion or core 24 which is formed from foamed polyurethane resin and which may be reinforced if desired. Each of the central bodies is provided with inner and outer skins 26 and 28 of any suitable construction. They may, for example, be resin impregnated glass fabric or aluminum sheet or the like. EAch of the panels further is provided with a frame made up of extruded aluminum channels 30 around the periphery thereof.

As has been pointed out hereinabove the particular container shown is erected by interengaging elements along adjacent edges of the base 12 side panels 14 and 16 and front and back panels 18 and 20. Since these interengageable means do not per se form any part of my invention they will not be described in detail. One example of such interengageable means is shown in the Luisada application referred to hereinabove. After the portion of the container described above has been erected and when cargo has been placed therein the top 22 is placed over the open top of the container. The back edge of the top 22 is provided with an inwardly directed angle (not shown) which engages a corresponding angle (not shown) on the upper edge of the back in the manner shown in the co-pending application. Respective pairs of angles 32 and 34 along the side edges of the top 22 house gaskets 36 which rest against the upper edges of the sides. Similarly brackets 82 and 84 along the front edge of the top engage the upper edge of the front panel 18 to bring a gasket 88 into engagement with the upper edge of the front panel. The bracket 84 may be formed with a hook 86 making up part of a latch to be described for holding the top in position on the box.

The particular form of normally collapsed expansible means illustrated in the drawings which provide dunnage for my cargo box includes a bellows-like structure indicated generally by the reference character 40 comprising a top piece 42, a bottom piece 44 and intermediate pieces 46 formed with central openings 47. These pieces, 42, 44 and 46 may be made from any suitable air-impervious material. For example, they may be formed from canvas or the like the surfaces of which have been rubberized so as to render them impervious to the passage of air. Alternatively any suitable flexible, synthetic, resin sheet material may be used to form the pieces of the bellows structure 40. I connect the outer edges of adjacent pieces by any suitable means. For example, the edges may be stitched and then heat sealed each to the other to provide an impervious seal around the edge. Alternatively in some instances heat sealing may be sufficient to provide the required seal. I have indicated the seals around the outer edges of adjacent pieces by the reference character 48. Similar seals 50 are provided around the inner edges of each of the adjacent pairs of intermediate pieces 46.

While I have illustrated a square configuration of bellows it will readily be appreciated that I may employ any shape which is adapted to hold cargo in position within the box 10. Openings 47 preferably are circular.

I secure brackets 52 around the inner surface of top 22 spaced slightly inwardly from the periphery thereof by any suitable means such as rivets or the like. One end of each of a plurality of elastic straps 54, the outer periphery of the top piece 42 and the first intermediate piece 50 therebelow all are secured to the brackets 52 at spaced locations therealong by any suitable means such as by rivets 56. The elastic straps 54 extend from the rivets 56 through D rings or the like carried by the pairs of intermediate pieces 50 at the peripheries thereof. After passing through the D rings 58 the other ends of the elastic straps 54 are secured to the assembly of the periphery of the lowermost intermediate piece 50 and the bottom piece 44 by any suitable means such, for example, as by rivets 60.

I form the panel 22 and the top piece 42 of the bellows structure 40 with an inlet opening 62 which I position a fitting 66 through which the inflating medium such as gas or air can be admitted to the bellows 40. An on-off valve 70 is adapted to be actuated to supply a suitable gas under pressure to the interior of the bellows structure 40 to expand the same. This may be achieved from any suitable source. It may be desirable to attach a cylinder of compressed gas 72 to the outside of the top 22 by means of a bracket 74. I also provide the top 22 with a relief valve comprising a housing 76 containing a valve 80 which is urged to closed position by a spring 80. It will readily be appreciated that if the pressure within the bellows exceeds a force proportional to that of the spring 80 valve 78 moves away from its seat to relieve the excess pressure.

While I have shown the elastic straps 54 for normally urging the bellows structure 40 to collapsed condition at which it lies substantially flat against the underside of the top 22, I may make the bellows structure itself out of an elastic material which is self-collapsing so as normally to rest against the under surface of the top 22.

Further while I have shown an inflatable structure which is resiliently urged to collapsed condition to provide dunnage I might provide any extensible and retractable structure which normally lies flat against the inside surface of the door 22 and which can be actuated so as to engage articles of cargo within the container.

In use of my dunnage door I first erect a container such as the container 10 by joining all of those panels except for the top 22 which is to form the final closure for the container. The container then is filled with cargo to a predetermined level such, for example, as that which will be determined by the amount of cargo available or by the sizes of the individual articles. Next the final closure member such as top 22 is secured in place and valve 70 is actuated to supply gas under pressure to the interior of the bellows structure 40 to expand the bellows to move the lower piece 44 up against the cargo in the box to hold it in position against shifting. In the course of shipment if, for example, the temperature rises to cause the pressure within the bellows 40 to increase valve 78 moves away from its seat to relieve the pressure until the pressure drops to the desired value. Upon arrival of the container at its destination the operator first actuates valve 70 to relieve the pressure within the container and then removes top 22 and unloads the cargo. The straps 54 pull the bellows flat against the underside of the top 22 as the fluid under pressure is released from the inside of the bellows. Now after cargo is unloaded the container can be disassembled and the parts stacked so as to permit shipment or storage without taking up excess space.

It will be seen that I have accomplished the objects of my invention. I have provided a dunnage door for a cargo box which takes up excess space in the box. My door prevents shifting of cargo in a partially filled box during shipment. It does away with the necessity of storing and having available dunnage during loading. It also eliminates the problem of disposing of dunnage at the point at which the container is unloaded. It is so constructed as to permit a container including the door to be stowed flat. It is simple in construction for the result achieved thereby.

It will be understood that certain features and subcombinations are of utility and may be employed without reference to other features and subcombinations.

This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what i claim is:

1. A dunnage door adapted to be assembled over the open end of a container partially filled with cargo including in combination, a door body having an inside surface, a bellows-like structure comprising an inner end piece attached to said inside surface, a plurality of intermediate pieces forming the side wall of said structure and an outer end piece, said pieces being assembled to enclose an air impermeable space, a plurality of elastic straps disposed outside said space and around the periphery of said structure, means for attaching one end of each of said straps to said inner end piece, means connecting the other end of each of said straps to said outer end piece, means coupling said intermediate pieces adjacent to the peripheries thereof to said straps intermediate the length thereof, said straps normally urging said structure to collapsed condition against said inner surface, and means accessible from outside said door for supplying gas under pressure to the inside of said structure.

2. A dunnage door as in claim 1 in which said means connecting said straps to said intermediate pieces comprise rings for receiving said straps.

3. A dunnage door as in claim 2 including a relief valve mounted in said door to provide communication between the inside of said structure and the outside of said box in response a predetermined buildup of pressure in said interior.

* * * * *